Nov. 18, 1952   H. S. NEWTON   2,618,301
ROTARY DOWEL CUTTING HEAD
Filed April 15, 1950
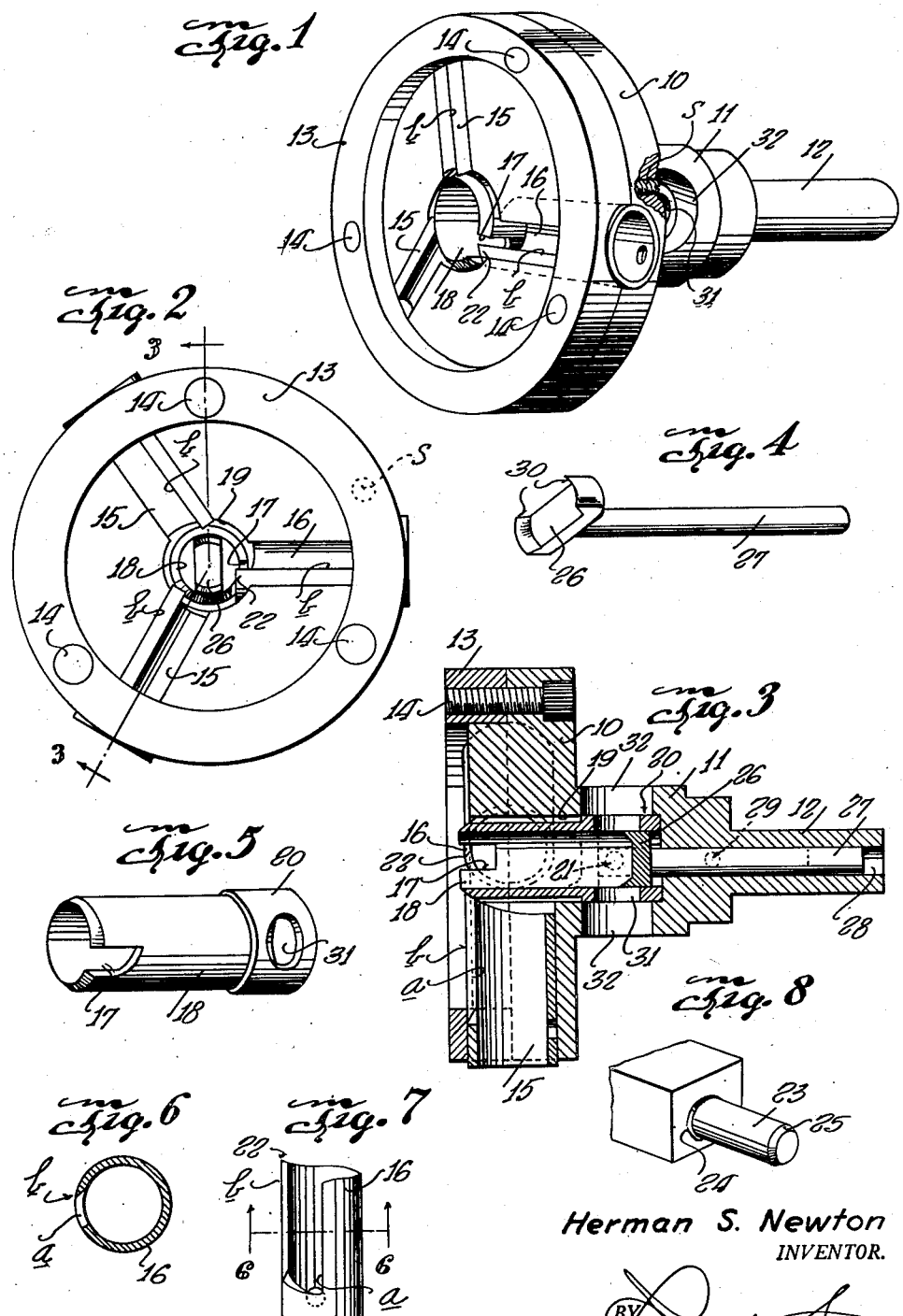
Herman S. Newton
INVENTOR.
BY
ATTORNEY Patented Nov. 18, 1952

2,618,301

UNITED STATES PATENT OFFICE 2,618,301

ROTARY DOWEL CUTTING HEAD

Herman S. Newton, Temple, Tex.

Application April 15, 1950, Serial No. 156,163

5 Claims. (Cl. 144—219)

This invention relates to chucking cutters and more particularly to dowel cutting heads for lathes.

The principal object of the invention is to provide a dowel cutting head comprising a circular body having mounted radially therein a plurality of tubular cutters whose inner ends are spirally formed and adapted to bear flush against the tapered end of an interchangeable pilot insert disposed for longitudinal adjustment in the center of the head and adapted to lead the tubular cutters to serve as a support for the work piece while the cutters are in contact with the work, thus to obviate chatter and chipping which would otherwise result from the force of the blades cutting the cross grain on wood.

Another object of the invention is to provide a self cleaning cutter head, together with instrumentalities for chamfering the dowel pin; cutting at the base of the dowel pin a glue sealing groove to serve also as an expansion gland for the glue as the wood joint is clamped tight and, by virtue of the cooperative relationship between parts of the head and the cutters, a provision for adjusting the finishing cutter without disturbing the companion roughing cutters.

Other objects will appear as the description proceeds, when considered with the accompanying drawing in which:

Figure 1 is a front perspective view of a chucking cutter constructed according to the invention.

Figure 2 is a front elevational view.

Figure 3 is a longitudinal sectional view taken on line 3—3 of Figure 2.

Figure 4 is a perspective view of the dowel chamfering insert, per se.

Figure 5 is a perspective view of the pilot insert per se.

Figure 6 is a sectional view of one of the tubular cutters, taken on line 6—6 of Figure 7.

Figure 7 is an elevational view of one of the tubular cutters, and

Figure 8 is a fragmentary perspective view showing an example of work produced by the invention.

Continuing with a more detailed description of the drawing, reference numeral 10 denotes the main body of the circular head, on the rear face of which is formed an annular boss 11 and a spindle 12, the latter being engaged by a lathe chuck, not shown. The front face of the body section 10 is annularly recessed to receive a cutter retaining ring 13 which is held in secure relationship with the body 10 by means of screws 14.

The confronting faces of the ring 13 and body 10 are provided with semi-circular recesses which, when in register, form circular passages to receive a pair of radially disposed and tubular roughing cutters 15 and the finish cutter 16, the latter being substantially the same in construction as the roughing cutters except that its spirally formed inner end, to be again referred to presently, is formed with a greater pitch than that of the companion cutters so that the point of its cutting edge may extend into the slot 17 of a pilot insert 18. Each of the cutters 15 and 16 are longitudinally slotted at a, one edge of the slot being sharpened as at b (Fig. 6), the sharpened edge b projecting from the semi-circular recesses beyond the front face of the body section 10.

The pilot insert 18 is also of tubular form and is disposed in the central bore 19 of the head 10, which bore, as revealed in Figure 3, extends into the annular boss 11 on the rear face of the head. The pilot insert is interchangeable with others of greater or lesser diameter to predetermine the size of the work produced and on the inner end of the insert is formed an annular protuberance 20 which snugly fits into the bore 19 and is engaged by a set screw 21, shown in dotted lines in Figure 3, adapted to hold the pilot insert against displacement from adjusted positions in the head.

It will be observed, especially in Figure 3, that the point of each of the roughing cutters 15 bears flush against the tapered end of the pilot insert 18. The pilot insert leads the cutting blades and supports the work piece so that the cutters may cut into the work without chattering or chipping. The point 22 of the finish cutter 16 enters the slot 17 of the pilot insert 18, as previously stated, and being so disposed, it is effective to cut the dowel pin 23 (Fig. 8) to correct size and to vary the size for tight or loose fit through longitudinal adjustment of the cutter 16.

The spiral form of inner ends of the cutters permit the cutters to be adjusted to proper position with respect to the pilot insert 18 as the sharpened edges b are worn by continual wear and occassional sharpening. The cutters are moved slightly inwardly and rotated slightly in a clockwise direction, as viewed from the outer ends of the cutters, as the cutters wear. The spiral form of the inner ends permit this inward movement after the cutters are rotated while providing adequate backing for the inner parts of the inner ends.

Adjustments of the finish cutter 16 may be more frequent than that of the roughing cutters 15 which latter are usually removed only for sharpening. Therefore, it is desirable that provision be made for changing the position of the finish cutter without disturbing adjustment of the roughing cutters. This is accomplished by loosening the clamp screw 14 next adjacent the finish cutter a greater amount than the companion screws nearest the roughing cutters 15 and driving inwardly the thrust screw S which is disposed in a threaded opening in the body section 10 to bear against the confronting face of the cutter retaining ring 13. The finish cutter may then move longitudinally a greater or lesser extent in the pilot insert to predetermine work diameter without affecting the companion cutters.

The operative end of the pilot insert 18, being tapered, cuts at the base of the dowel pin 23 an annular groove 24 (Fig. 8) which will receive glue when the dowel is inserted into a companion piece and will serve as an expansion gland for the glue when the parts are clamped tight. For a similar purpose, the cutter head is provided with a chamfering insert 26, Figure 4, which also serves, by reason of its longitudinal adjustability, as a stop for the work to predetermine the length of the dowel being cut. This insert has a head whose length is transverse and equal to the inner diameter of the bore of the pilot insert 18 in which it reposes at the rear end and is provided with a tail portion 27 which extends rearwardly in a continuation 28 of the bore 19 of the body 10 but of smaller diameter. A set screw 29 threadedly enters the shank 12 of the head to communicate with the smaller bore 28 and bears against the tail of the chamfering element 26 to hold the same in adjusted positions.

The ends 30 of the chamfering head 26 are each curved to conform to the bore of the pilot insert 18 and are tapered to a sharp edge, as shown, thus to cut the bevel 25 on the end of the dowel formed by the cutters 15 and 16 and extending through the bore.

Cuttings made by the cutters from the work as it develops are received in the bores of the cutters and are thrown outwardly through the cutters beyond the periphery of the cutter head by centrifugal force. The cuttings made by the ends of the chamfering head are thrown out of the head through openings 31 in the inner end of the pilot insert 18 which is oriented to dispose these openings in register with diametrically opposed openings 32 in the boss 11 of the rear face of the head 10.

It will be observed that the cutting head shown and described has been designed with a view toward efficiency in performance as well as safety in operation, the same having no protruding screws or other parts likely to cause injury to the operator.

Manifestly, the construction as shown and described is capable of some modification and such modification as may be construed to fall within the scope and meaning of the appended claims is also considered to be within the spirit and intent of the invention.

What is claimed is:

1. A chucking cutter comprising a sectional, rotatable head having an axial bore therein, a slotted pilot insert interchangeably and adjustably disposed in the bore of said head and having a tapered operative end, a plurality of radially arranged, tubular cutters clampingly held in said head having spirally formed ends bearing against the tapered end of said pilot insert except one, the latter defining a finish cutter having a point entering said bore through the slot of said pilot insert to predetermine the diameter of work reduced by said cutters and developed in said bore, and means to effect longitudinal adjustment of said finish cutter and said pilot insert.

2. The structure of claim 1 including a work chamfering head disposed for longitudinal adjustment in the axial bore of the head.

3. A chucking cutter including a circular head comprising a circular main body and a retaining ring releasably secured to said main body, said main body having an axial bore and a plurality of radial recesses extending from said bore to the outer periphery of the main body; a plurality of tubular cutters disposed in said recesses and clamped in said recesses by said retaining ring, said main body having an outer face lying in a plane perpendicular to the central axis of said main body; a tubular insert removably and adjustably disposed in said axial bore, said insert having a tapered operative end adjacent said outer face of said main body and having a slot extending longitudinally from said operative end, one of said cutters having an inner end extending into said slot, the other cutters having inner ends bearing against the tapered operative end of said insert, said cutters having cutting edges extending radially outwardly from said inner ends, said cutting edges projecting beyond said outer face of said main body.

4. A chucking cutter including a circular head comprising a circular main body and a retaining ring releasably secured to said main body, said main body having an axial bore and a plurality of radial recesses extending from said bore to the outer periphery of the main body; a plurality of tubular cutters disposed in said recesses and clamped in said recesses by said retaining ring, said main body having an outer face lying in a plane perpendicular to the central axis of said main body; a tubular insert removably and adjustably disposed in said axial bore, said insert having a tapered operative end adjacent said outer face of said main body and having a slot extending longitudinally from said operative end, one of said cutters having an inner end extending into said slot, the other cutters having inner ends bearing against the tapered operative end of said insert, said cutters having cutting edges extending radially outwardly from said inner ends, said cutting edges projecting beyond said outer face of said main body, said tubular cutters having open outer ends whereby cuttings are discharged from within said cutters.

5. A chucking cutter including a rotatable head in separable sections having an axial bore, a pilot insert longitudinally adjustable in said bore having a tapered and sharpened groove cutting end provided with a longitudinal slot, a plurality of radially disposed tubular cutters clampingly held in said head, one of said cutters having a point on its inner end entering said bore through the slot of said pilot insert to predetermine the diameter of work produced by said cutters, an annular boss on the rear face of the head having diametrically opposed openings communicating with the axial bore of the head and adapted to register with like openings in the pilot insert through which cuttings are discharged from said insert, and means arranged for longitudinal adjustment in said bore for chamfering the end of a work piece developed in said bore.

HERMAN S. NEWTON.

(References on following page)

REFERENCES CITED

The following references are of record in the file of this patent:

UNITED STATES PATENTS

| Number | Name | Date |
|---|---|---|
| 32,910 | Coppage | July 23, 1861 |
| 302,941 | Robarge | Aug. 5, 1884 |
| 430,144 | Palmer | June 17, 1890 |
| 446,476 | Seymour | Feb. 17, 1891 |
| 512,564 | Rapp | Jan. 9, 1894 |
| 581,178 | Shiner | Apr. 20, 1897 |
| 1,405,903 | Diller | Feb. 7, 1922 |
| 1,750,394 | Dumont | Mar. 11, 1930 |
| 2,584,492 | Newton | Feb. 5, 1952 |

FOREIGN PATENTS

| Number | Country | Date |
|---|---|---|
| 341,811 | Germany | Oct. 8, 1921 |